June 13, 1933.  L. E. LA BRIE  1,913,932
VEHICLE BRAKE
Original Filed Feb. 27, 1925  2 Sheets-Sheet 1

Witness
Martin H. Olsen

Inventor
Ludger F. LaBrie
By Cromwell, Greist & Worden
Attys.

June 13, 1933.  L. E. LA BRIE  1,913,932
VEHICLE BRAKE
Original Filed Feb. 27, 1925  2 Sheets-Sheet 2
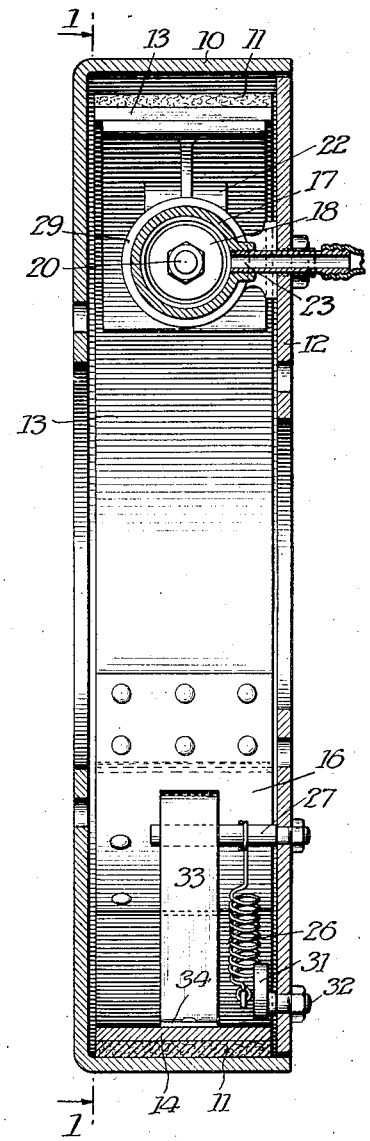
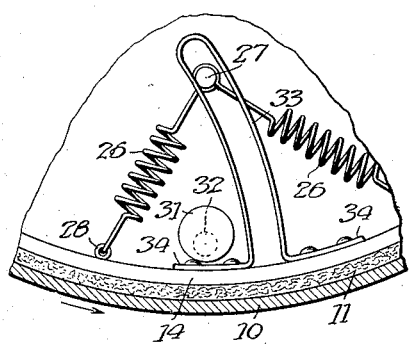
Witness
Martin H. Olsen
Inventor
Ludger E. LaBrie
By Cromwell, Greist & Warden
Attys Patented June 13, 1933

1,913,932

UNITED STATES PATENT OFFICE

LUDGER E. LA BRIE, OF SOUTH BEND, INDIANA, ASSIGNOR, BY MESNE ASSIGNMENTS, TO BENDIX AVIATION CORPORATION, OF NEW YORK, N. Y., A CORPORATION OF DELAWARE

VEHICLE BRAKE

Application filed February 27, 1925, Serial No. 11,936. Renewed December 10, 1928.

This invention relates to vehicle brakes.

One object of the invention is to provide an improved brake wherein a servo braking action may be had in connection with either forward or reverse rotation of the associated wheel.

A further object is to provide in combination improved hydraulic applying anchoring means for a brake adapted to anchor at one end or the other depending upon the direction of drum rotation.

Still another object is to provide a brake which is of light, durable and inexpensive construction, simple arrangement, and efficient operation.

Other objects and advantages will be evident upon an understanding of the invention as had from the illustrative embodiment of the same presented in the accompanying drawings and in the following detailed description bases thereon. The invention is susceptible, however, of embodiment in various other structurally modified forms which come equally within the spirit of the invention as defined by the appended claims.

In the drawings:

Fig. 2 is a diametric section taken on the line 2—2 of Fig. 1;

Fig. 3 is a fragmentary view corresponding to a portion of Fig. 1 showing the brake positioning means when the brake is applied while the vehicle is moving forward.

Figure 1:
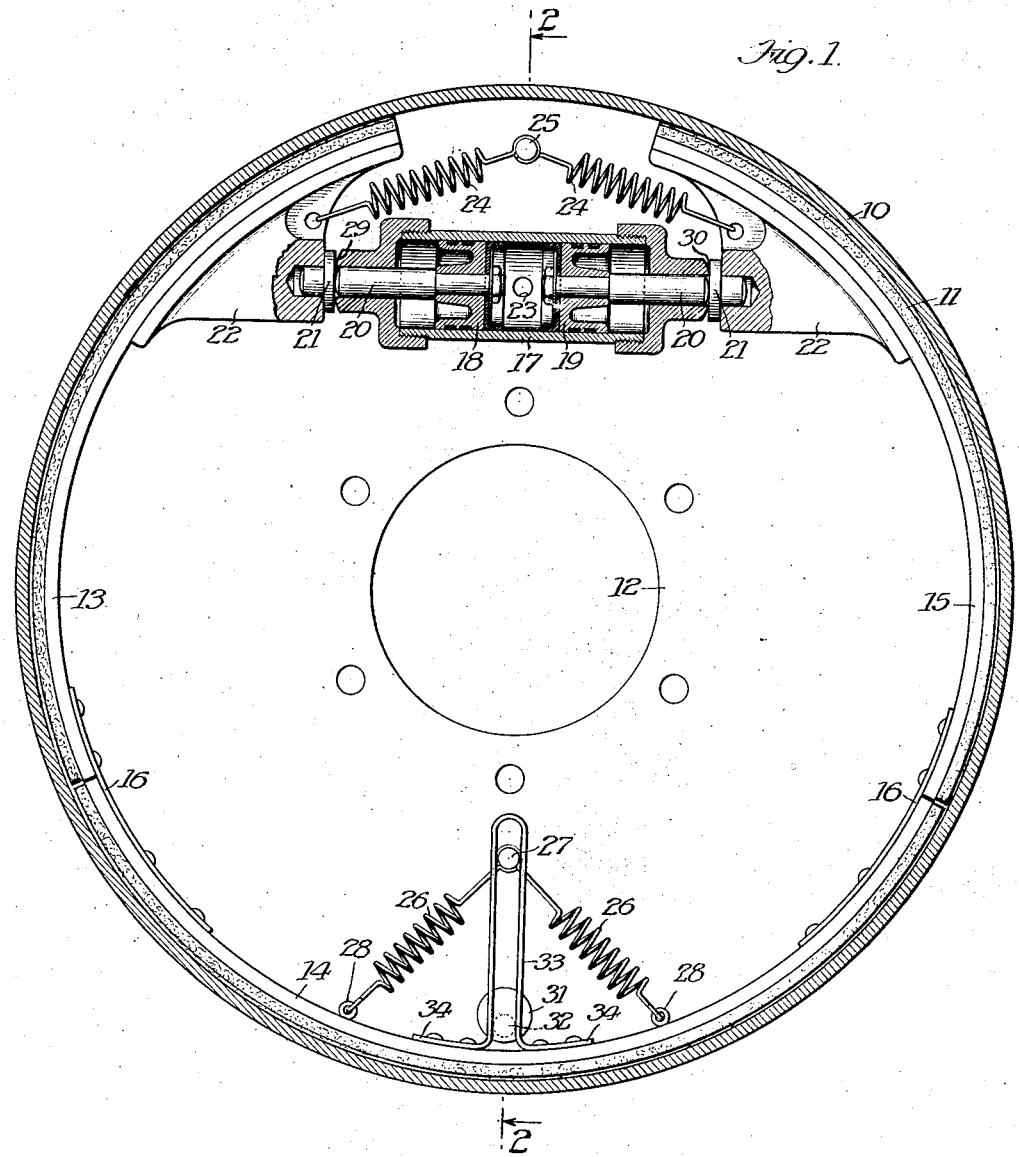
Fig. 1 is an interior view of the brake, taken on the line 1—1 of Fig. 2 and showing the brake in its non-applied position.

The brake includes a drum 10, and a plurality of articulated shoes 11 for engagement with the inner face of the drum upon the application of the brake. The drum 10 is fixedly secured to a vehicle wheel or other rotatable element to be braked, and the shoes 11 are associated with an anchor plate 12 or other non-rotatable mounting in a novel manner hereinafter described.

In this particular embodiment of the invention, three shoes 13, 14 and 15 are employed, and the articulations between the abutting ends of the shoes are effected by the use of leaf springs 16 which are secured contiguously to the backs of the shoes by rivets or other suitable means; but it will be obvious that, in arriving at certain of the advantages of the brake, a greater or less number of shoes may be employed, and other forms of articulations may be used. Shoes 13, 14 and 15 may be regarded as segments or sections of a substantially continuous friction band which is expansible as a whole, although the several segments may, if desired, be substantially rigid, or may be partially flexible.

A fluid cylinder 17 is secured to the upper portion of the anchor plate 12 at a point between the free ends of the two end shoes 13 and 15, and is provided with two oppositely reciprocating pistons 18 and 19 having stems 20 which are adapted to move against thrust plates 21 carried by brackets 22 secured to the end shoes 13 and 15 adjacent the free ends of the same. The cylinder 17 is also provided with an inlet 23 through which any suitable fluid under pressure may be fed into the cylinder to effect a separative movement between the pistons 18 and 19 whereby to expand the shoes into frictional engagement with the drum.

When the brake is in its released position, the three shoes are contracted relative to each other by means of a pair of upper shoe-contracting springs 24 which extend between a pin 25 projecting from the upper portion of the anchor plate 12 and the two brackets 22 secured to the end shoes 13 and 15, and are held up out of engagement with the bottom of the drum by means of a pair of lower shoe-supporting springs 26 extending between a pin 27 projecting from the lower portion of the anchor plate 12 and two attaching eyes 28 secured to the intermediate shoe 14 at points equidistant from the center of the same.

The extent to which the shoes are contracted and elevated by the springs 24 and 26 is limited by contact of the thrust plates 21 on the end shoes 12 and 15 with the ends 29 and 30 of the cylinder 17, and by contact of the back of the intermediate shoe 14 with the lower surface of a disc 31 which is eccentrically mounted for the purpose of adjustment on an exteriorly accessible stem 32 in an aperture in the lower portion of the anchor plate.

It will be evident from the foregoing description that, if the brake is applied when the drum 10 is stationary, the pistons 18 and 19 will force the end shoes 13 and 15 and the intermediate shoe 14 into frictional engagement with the drum. If the brake is applied however when the drum 10 is rotating in the direction indicated in Fig. 3, the end shoe 13 will move circumferentially of the drum as soon as it is forced into frictional engagement with the same by the piston 18, the intermediate shoe 14 will be forced by the end shoe 13 into frictional engagement with the drum, and the end shoe 15 will in turn be forced by the preceding shoes 13 and 14 into frictional engagement with the drum. The circumferential movement of the shoes caused by the rotation of the drum is limited by contact of the thrust plate 21 with the end 30 of the cylinder 17, as the piston 19 will yield and move back in the cylinder under the pressure exerted thereon by the shoes in their circumferential movement. Very little pressure is required for the application of the brake when the drum is rotating in the direction indicated in Fig. 4, as the friction initially engendered between the shoe 13 and the drum serves to force the following shoes 14 and 15 into frictional engagement with the drum. When the drum is rotating in the opposite direction, this servo or self-energizing braking action of the shoes relative to the drum may be had, the end shoe 15 then serving as the means for forcing the following shoes 14 and 13 into frictional engagement with the drum.

The means for returning all of the shoes in either direction circumferentially of the drum to their normal positions after the brake has been released, consists of a U-shaped spring 33 having oppositely bent end portions 34 which are secured by rivets or other suitable means to the back of the intermediate shoe 14. The pin 27, which was previously described as the mounting for the springs 26, extends through the slot formed between the spaced sides of the spring 33. When the shoes are caused to move circumferentially with the drum a limited distance in accomplishing the servo braking action, the spring 33 is resiliently flexed by the pin 27 as shown in Fig. 3, and, when the brake is released and the springs 24 and 26 draw the shoes out of engagement with the drum, the stress in the spring 33 occasioned by the flexing of the same serves to oscillate the shoes as a unit back to their normal positions, as shown in Fig. 1.

It will be observed that the ends 29 and 30 of the cylinder 17, which serve to stop circumferential movement of the end shoe coming into contact therewith, form acute angles with the adjacent portions of the drum and thereby afford a wedging action on the shoes which augments the servo action described.

Certain features of the brake disclosed herein are claimed in my copending divisional application Serial Number 622,785, filed July 15, 1932. Said divisional application has an identical disclosure with the disclosure hereof. Both applications disclose a brake including a friction device, a return means for said friction device, and applying and anchoring means therefor. Generally speaking this application is directed toward the applying and anchoring means while the divisional application is directed toward the return means and the friction means. The claims of this application are directed toward the applying means per se and the anchoring per se, and toward the combination of the applying means and/or anchoring means with each other, with other elements of the brake, or with other features thereof, except the combination of the applying means and/or anchoring means with the return means. All other features and combinations are claimed in the divisional application. The claims of the divisional application are directed therefore toward the return means per se, the friction means per se, and all combinations of elements and features of the brake excepting combinations of the applying means and/or anchoring means with other elements than the return means.

I claim:

1. In a brake, a drum carried by a rotatable element to be braked, a flat partially-flexible band formed of a plurality of segments carried by a non-rotatable mounting and shiftable bodily relative thereto into engagement with the drum, means for moving either one of the end segments into engagement with the drum to cause all of the segments to move circumferentially of the drum and into engagement with the same in the direction in which the drum is rotating, and means for limiting the movement of all of the segments circumferentially of the drum.

2. In a brake, a drum carried by a rotatable element to be braked, a plurality of connected flat and partially-flexible segments carried by a non-rotatable mounting and shiftable bodily relative thereto into engagement with the drum, means interposed between the end segments and expansible under fluid pressure against the same for moving either one of the end segments into engagement with the drum to cause all of the shoes to move circumferentially of the drum and into engagement with the same in the direction in which the drum is rotating, and means for anchoring the other of the end segments against movement circumferentially of the drum.

3. A brake comprising, in combination, a drum, an expansible friction device within the drum having adjacent separable ends, and fluid-pressure brake-applying means between said ends including a stationary cylinder and at least one piston within the cylinder and acting on the end of the friction device, one of said ends being arranged to anchor on the cylinder independently of the piston.

4. A brake comprising, in combination, a drum, an expansible friction device within the drum having adjacent separable ends, and fluid-pressure brake-applying means between said ends including a stationary cylinder and two pistons within the cylinder and acting on the ends of the friction device, said ends being arranged to anchor alternatively on the cylinder according to the direction of drum rotation independently of the pistons.

5. A brake comprising, in combination, a drum, an expansible friction device within the drum having adjacent separable ends, and fluid-pressure brake-applying means between said ends including a stationary cylinder and two pistons within the cylinder and acting on the ends of the friction device, said ends being arranged to anchor alternatively on the cylinder according to the direction of drum rotation by direct engagement therewith, said pistons being withdrawable within the cylinder to permit said direct anchoring engagement of the ends of the friction device with the cylinder.

6. A brake comprising, in combination, a drum, a friction device within the drum having adjacent separable ends, anchorage and fluid-power applying means adjacent said ends and against which said ends alternatively anchor, said means including a stationary cylinder having stationary anchorage members at its ends engaging the ends of the friction device, and further including pistons within said cylinder having thrust parts movable extending through said members and operatively engaging said ends.

7. A brake comprising, in combination, a drum, a shiftable friction device engageable with the drum and urged by the drum friction to anchor adjacent one end when the drum is turning in one direction and adjacent the other end when the drum is turning in the other direction, a stationary cylinder adjacent said ends, a pair of pistons within the cylinder arranged to exert thrust on said ends respectively to apply the brake, and stationary means mounted on and carried by said cylinder and directly engaged by said ends in anchoring and taking the braking torque from one or the other of said ends.

8. A brake comprising, in combination, a drum, a shiftable friction device engageable with the drum and urged by the drum friction to anchor adjacent one end when the drum is turning in one direction and adjacent the other end when the drum is turning in the other direction, a stationary cylinder adjacent said ends, a pair of pistons within the cylinder arranged to exert thrust on said ends respectively to apply the brake, and stationary anchorage means taking the braking torque from one or the other of said ends both the piston and said means engaging the friction device at respectively different points.

9. A brake comprising, in combination, a drum, a shiftable friction device engageable with the drum and urged by the drum friction to anchor adjacent one end when the drum is turning in one direction and adjacent the other end when the drum is turning in the other direction, a stationary cylinder adjacent said ends, a pair of pistons within the cylinder arranged to exert thrust on said ends respectively to apply the brake, and stationary means mounted on and carried by said cylinder and directly engaged by said ends in anchoring and taking the braking torque from one or the other of said ends without affecting either of the pistons or restraining their movements, said stationary means comprising parts threaded on the opposite ends of the cylinder, and said pistons having thrust members passing through said parts to engage the friction device adjacent its opposite ends.

10. A brake comprising, in combination, a drum, a shiftable friction device engageable with the drum and urged by the drum friction to anchor adjacent one end when the drum is turning in one direction and adjacent the other end when the drum is turning in the other direction, a stationary cylinder adjacent said ends, a pair of pistons within the cylinder arranged to exert thrust on said ends respectively to apply the brake, and stationary means mounted on and carried by said cylinder and directly engaged by said ends in anchoring and taking the braking torque from one or the other of said ends without affecting either of the pistons or restraining their movements, said stationary means comprising parts mounted on the opposite ends of the cylinder, and said pistons having thrust members passing through said parts to engage the friction device adjacent its opposite ends.

11. A brake comprising, in combination, a drum, an expansible friction device within the drum having adjacent separable ends, and means adjacent and acting on said ends and including movable fluid-pressure applying members and stationary anchorage means adapted to come into direct engagement with one end of the friction device when the drum is turning in one direction and with the other end thereof when the drum is turning in the other direction.

12. A brake comprising, in combination, a drum, an expansible friction device within the drum having adjacent separable ends, and fluid-pressure brake-applying and anchorage means between said ends including stationary parts adapted to come into direct engagement with said ends and arranged to take the braking torque from one of said ends when the drum is turning in one direction and from the other of said ends when the drum is turning in the other direction and also including pistons operatively engaging said ends at points different from the points of engagement of said stationary parts therewith.

13. A brake comprising, in combination, a drum, a friction device within the drum arranged to anchor at one end when the drum is turning in one direction and at the other end when the drum is turning in the other direction, and anchorage and fluid-power applying means between said ends and including a stationary anchorage against which said ends alternatively anchor and which includes a pair of floating pistons thrusting outwardly on said ends to apply the brake, both the anchorage and the pistons being in engagement with said ends at respectively different points when the brake is released.

14. A brake comprising, in combination, a drum, a shiftable-anchorage friction device within the drum, and anchorage and fluid-power applying means adjacent said ends, and including stationary anchorage parts and brake applying pistons both arranged to engage the friction device at respectively different points.

In testimony whereof I have hereunto subscribed my name.

LUDGER E. LA BRIE.